(12) United States Patent
Xiao

(10) Patent No.: US 9,830,020 B2
(45) Date of Patent: Nov. 28, 2017

(54) TOUCH PANEL

(71) Applicants: Boe Technology Group Co., Ltd., Beijing (CN); Ordos Yuansheng Optoelectronics Co., Ltd., Inner Mongolia (CN)

(72) Inventor: Ang Xiao, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

(*) Notice: Subject to any disclaimer, the term of this patent is extended or adjusted under 35 U.S.C. 154(b) by 402 days.

(21) Appl. No.: 14/555,919

(22) Filed: Nov. 28, 2014

(65) Prior Publication Data
US 2016/0117013 A1    Apr. 28, 2016

(30) Foreign Application Priority Data
Oct. 27, 2014  (CN) .......................... 2014 1 0580407

(51) Int. Cl.
*G06F 3/045*  (2006.01)
*G06F 3/042*  (2006.01)

(52) U.S. Cl.
CPC .. *G06F 3/0421* (2013.01); *G06F 2203/04109* (2013.01)

(58) Field of Classification Search
CPC ..................... G06F 3/0421; G06F 2203/04109
See application file for complete search history.

(56) References Cited

U.S. PATENT DOCUMENTS

| 2006/0279558 A1* | 12/2006 | Van Delden | G02F 1/13338 345/176 |
| 2007/0084989 A1* | 4/2007 | Lange | G02B 6/0011 250/221 |
| 2007/0125937 A1* | 6/2007 | Eliasson | G06F 3/0414 250/221 |

(Continued)

FOREIGN PATENT DOCUMENTS

| CN | 101639824 | 9/2009 |
| CN | 101739178 | 6/2010 |

(Continued)

OTHER PUBLICATIONS

Xinlin et al.; English Translation of CN201773384; Mar. 23, 2011.*

(Continued)

*Primary Examiner* — Amare Mengistu
*Assistant Examiner* — Crystal A Mathews
(74) *Attorney, Agent, or Firm* — Calfee, Halter & Griswold LLP

(57) ABSTRACT

The present disclosure relates to a touch panel. The touch panel includes a substrate; one or more infrared light-emitting devices; an infrared total reflection coverplate that is deformable in response to a touch of a touching object; an infrared sensing layer including at least one sensing wire in a first direction and at least one sensing wire in a second direction. The sensing wires in the first direction and the sensing wires in the second direction are insulated from each other and are made of photoconductive material sensitive to the infrared light emitted from the infrared light-emitting device.

14 Claims, 4 Drawing Sheets

(56) References Cited

U.S. PATENT DOCUMENTS

| | | | | |
|---|---|---|---|---|
| 2008/0122803 A1* | 5/2008 | Izadi | G06F 3/0421 345/175 |
| 2009/0219253 A1* | 9/2009 | Izadi | G06F 3/0421 345/173 |
| 2010/0123665 A1* | 5/2010 | Birkler | G06F 3/0421 345/173 |
| 2010/0302210 A1* | 12/2010 | Han | G06F 3/0412 345/175 |
| 2011/0221705 A1* | 9/2011 | Yi | G06F 3/0425 345/175 |
| 2013/0127790 A1* | 5/2013 | Wassvik | G06F 3/042 345/175 |
| 2015/0220163 A1* | 8/2015 | Leigh | G06F 3/0421 345/179 |
| 2015/0242056 A1* | 8/2015 | Hoffman | G06F 3/0428 345/175 |
| 2016/0034109 A1* | 2/2016 | Cho | G06F 1/16 345/175 |
| 2016/0170565 A1* | 6/2016 | Ilmonen | G02B 6/005 345/175 |

FOREIGN PATENT DOCUMENTS

| | | |
|---|---|---|
| CN | 201773384 | 3/2011 |
| CN | 102341774 | 2/2012 |
| CN | 102890379 | 1/2013 |
| CN | 202736001 | 2/2013 |
| CN | 103197796 | 7/2013 |
| CN | 103268178 | 8/2013 |
| CN | 203480490 | 3/2014 |

OTHER PUBLICATIONS

Office action from Chinese Application No. 201410580407.6 dated Oct. 31, 2016.
Office action from Chinese Application No. 201310436208.3 dated Dec. 2, 2015.
Office action from Chinese Application No. 201410580407.6 dated Mar. 9, 2017.
Third Office action from Chinese Application No. 201410580407.6 dated Jun. 16, 2017.

* cited by examiner

TOUCH PANEL

RELATED APPLICATIONS

The present application claims the benefit of Chinese Patent Application No. 201410580407.6, filed Oct. 27, 2014, the entire disclosure of which is incorporated herein by reference.

FIELD OF THE DISCLOSURE

The present disclosure refers to the field of touch technologies, particularly to a touch panel.

BACKGROUND OF THE DISCLOSURE

A touch panel is an input device that allows a user to input user instructions directly with his fingers or a pointing object by selecting an icon displayed on the screen of an image display etc. When the user is touching the touch panel directly with his fingers or the pointing object, the touched points are detected by the touch panel and then the image display is driven in accordance with the instruction corresponding to the selected icon, thus achieving a specific display.

In accordance with the implementation principle, existing touch panels can be categorized mostly into capacitive touch panels and electromagnetic touch panels, wherein the capacitive touch panel identifies a touch operation from the received touch signal, i.e. an electrical signal, while the electromagnetic touch panel identifies a touch operation from the received signal, i.e. an electromagnetic signal from an electromagnetic pointer. Taking the self-capacitive touch panel, which is a kind of capacitive touch panel, as an example, it achieves the detection of the touched positions by fingers using a self-capacitive principle, which specifically comprises arranging in the touch panel multiple self-capacitive electrodes that are arranged in the same layer and separated from each other, wherein the capacitance achieved by each of the self-capacitive electrodes is of a fixed value when the screen is not touched by a human body, and the capacitance suffered by the self-capacitive electrode corresponding to a touched position is the fixed value plus the capacitance of a human body when the screen is touched by the human body; therefore, the touched positions can be recognized by a touch detecting chip during the touching period of time by detecting the change in the capacitance value of each self-capacitive electrodes. In practical implementation, the number of the self-capacitive electrodes is huge. For a self-capacitive electrode occupying an area of e.g. 5 mm*5 mm, a crystal liquid display of 5-inch requires 264 self-capacitive electrodes. In case an even smaller self-capacitive electrode is designed, more self-capacitive electrodes will be needed.

Therefore, the touch panel in the prior art is of a complex structure, which results in a complicated manufacture process and a higher cost.

SUMMARY OF THE DISCLOSURE

In accordance with a respect of the present disclosure, a touch panel is provided, the touch panel comprising:
a substrate;
one or a plurality of infrared light-emitting devices;
an infrared total reflection coverplate that is deformable in response to a touch of a touching object;
an infrared sensing layer comprising at least one sensing wire in a first direction and at least one sensing wire in a second direction, wherein the sensing wires in the first direction and the sensing wires in the second direction are insulated from each other and are made of photoconductive material sensitive to the infrared light emitted from the infrared light-emitting device; and
a detecting unit for detecting the electric current through or the voltage across each of the sensing wires in the first direction and each of the sensing wires in the second direction, and determining the touched region of the touching object according to a change of the electric current and/or the voltage.

Optionally, the touch panel further comprises an OLED device. When the touch panel acts as a touch display, the OLED device may provide a presentation of the displayed content.

Optionally, the one or the plurality of infrared light-emitting devices are arranged between the substrate and the infrared total reflection coverplate, and the infrared sensing layer is arranged on the outer side of the infrared total reflection coverplate along the direction of the emergent light from the infrared light-emitting devices.

Optionally, the one or the plurality of infrared light-emitting devices are arranged between the substrate and the infrared sensing layer, and the infrared total reflection coverplate is arranged on the outer side of the infrared sensing layer along the direction of the emergent light from the infrared light-emitting devices.

The present disclosure performs the sensing and positioning of a touching object using the sensing wires in the first direction and in the second direction that are sensitive to the infrared light, without the need for introducing other touch sensing devices (e.g., self-capacitive electrodes), thus reducing the complexity of the touch panel and facilitating a reduction of the weight and the production cost of the touch panel.

These and other aspects of the disclosure will be apparent from and elucidated with reference to the drawings and embodiment(s) described hereinafter.

DETAILED DESCRIPTION OF PREFERRED EMBODIMENTS

The present disclosure is based on the following principle: when being touched, the infrared total reflection coverplate is made to deform locally by the press of the touching object on the panel, and the reflection/transmission condition for the infrared light is altered in the deformed region of the infrared total reflection coverplate, resulting in a change in the output signal of the infrared sensing layer that is sensitive to the infrared light; the deformed region (i.e. the touched region of the touching object) is determined by detecting such a change.

In the following, embodiments of the present disclosure are described in detail in connection with the accompanying drawings.

Figure 1:
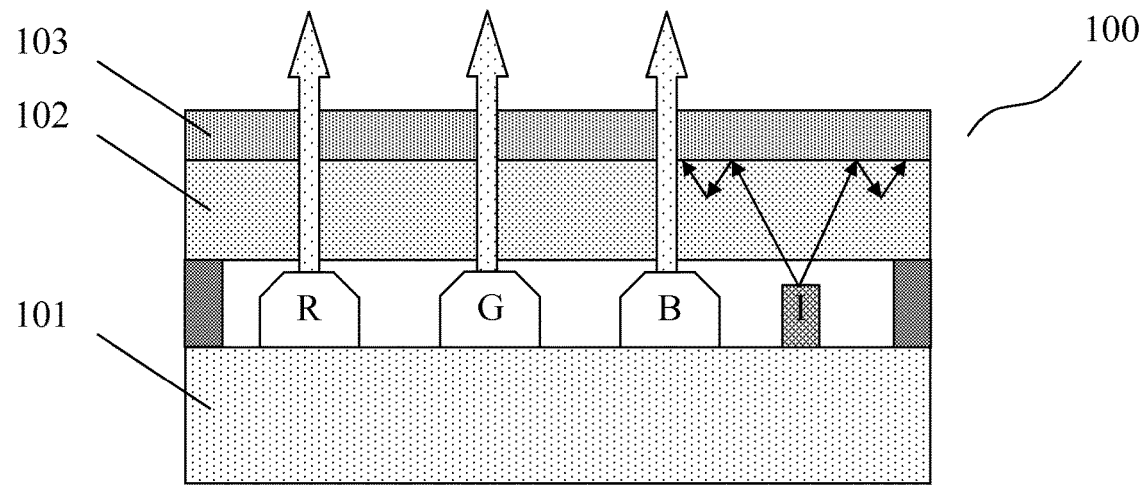
FIG. 1 is a side view of the touch panel according to an embodiment of the present disclosure.

FIG. 1 is a side view of the touch panel 100 according to an embodiment of the present disclosure. As is shown in the figure, the touch panel 100 may comprise a substrate 101, an OLED device (e.g. the OLEDs based on the principle of individually light-emitting for R, G and B pixels in the figure, which is referred to as an OLED device for short), an infrared light-emitting device I, an infrared total reflection coverplate 102, an infrared sensing layer 103 and a detecting unit (not shown).

The OLED device (R, G, B) may be fabricated on the substrate 101, the visible light emitted from which passes through the infrared total reflection coverplate 102 and the infrared sensing layer 103, and then transmits out of the touch panel 100 (as is shown by the broad arrows in the figure), thus providing a function of display. For simplicity, the OLED device is shown as the type of emitting light individually for R, G and B pixels in the figure; however, other types of OLED colorization technologies such as color conversion or color filter may be used. It is to be noted that if the touch panel 100 is used as a common touchpad, e.g. the touchpad which is arranged near the keyboard region of a laptop and separated from the display, rather than a touch display, the OLED device is not necessary (discussed below).

The infrared light-emitting device I may be arranged between the substrate 101 and the infrared total reflection coverplate 102, and the infrared sensing layer 103 may be arranged on the outer side of the infrared total reflection coverplate 102 along the direction of the emergent light from the OLED device (R, G, B) or the infrared light-emitting device I. The infrared light emitted from the infrared light-emitting device I is reflected totally by the infrared total reflection coverplate 102 back into the touch panel 100 (as is shown by the solid arrows in the figure), so that the infrared light cannot be sensed by the infrared sensing layer 103. Only one infrared light-emitting device I is shown herein, a plurality of infrared light-emitting devices, however, may be employed to produce a more intense and more uniform output of infrared light. In one example, the infrared light-emitting device I may be made of a material of BPhen (4,7-diphenyl-1,10-orthophenanthrolene) doped with [Zn$(C_{19}H_{19}Br_2N_2O_2)Yb(NO_3)_3Py$] and CuPc (copper phthalocyanine), the infrared light emitted from which has a wavelength of 700-950 nm, with the peak reached at 890 nm.

Figure 2:
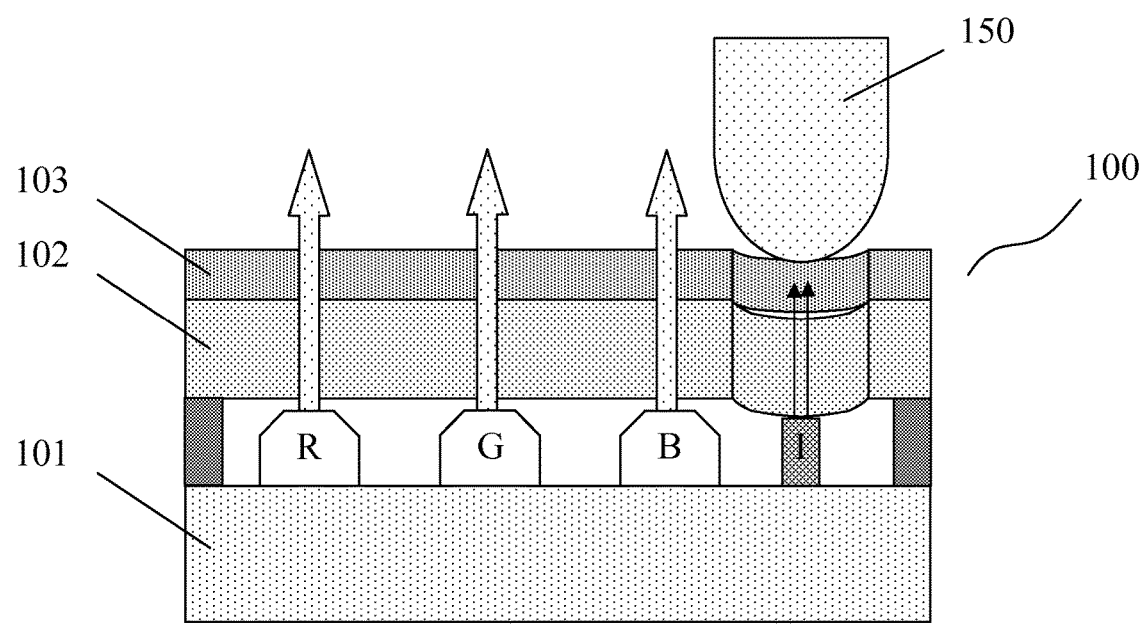
FIG. 2 is a side view of the touch panel in a touched state according to an embodiment of the present disclosure.

FIG. 2 is a side view of the touch panel 100 in a touched state according to an embodiment of the present disclosure. When in touch operation, the infrared total reflection coverplate 102 (and the infrared sensing layer 103), under the pressure of the touching object 150, is deformed in a certain extent, leading to a change in the reflection condition for the infrared light emitted from the infrared light-emitting device I. At this time, the infrared light in the deformed region cannot be totally reflected by the infrared total reflection coverplate 102 back into the touch panel 100; thus there is a portion of the infrared light which transmits through the infrared total reflection coverplate 102 and is sensed by the infrared sensing layer 103 (as is shown in the figure), and in turn causes a change in the output signal of the sensing wires in the infrared sensing layer 103. Such a change is detected by the detecting unit; thereby the deformed region is determined as the touched region of the touching object (discussed below).

Figure 3:
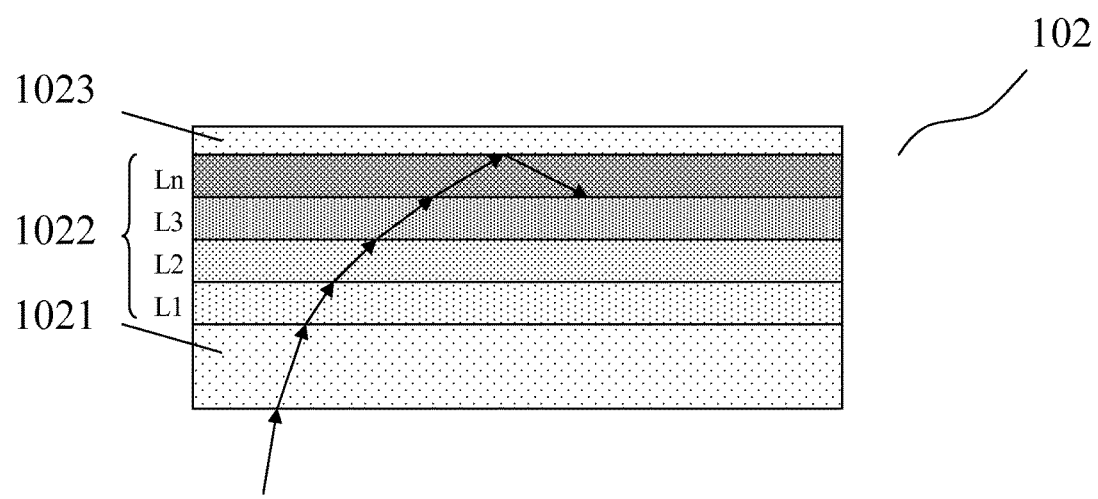
FIG. 3 is a schematic diagram of the structure of the infrared total reflection coverplate of the touch panel according to an embodiment of the present disclosure.

FIG. 3 is a schematic diagram of the structure of the infrared total reflection coverplate 102 of the touch panel according to an embodiment of the present disclosure. As is shown in the figure, the infrared total reflection coverplate 102 may comprise a transparent substrate 1021, a gradient-refractive-index Indium Tin Oxide (ITO) layer 1022 and an optically less dense transparent substrate or coat 1023, wherein the gradient-refractive-index ITO layer 1022 is arranged on the outer side of the transparent substrate 1021 along the direction of the emergent light emitted from the OLED device or the infrared light-emitting device I, and the refractive index of the gradient-refractive-index ITO layer 1022 to the infrared light is larger than that of the transparent substrate 1021. By way of example, and not limitation, the transparent substrate 1021 may have a refractive index of 1.5-1.7 to the infrared light and the gradient-refractive-index ITO layer 1022 may have a refractive index of 1.7-1.8 to the infrared light. The gradient-refractive-index ITO layer 1022 comprises n layers of ITOs L1, L2, L3, . . . , Ln which are stackedly arranged in sequence along the direction of the emergent light, with the refractive indices thereof to the infrared light increasing progressively. Moreover, the refractive index of the optically less dense transparent substrate or coat 1023 to the infrared light is less than that of the Ln layer of the gradient-refractive-index ITO layer 1022. Therefore, a total reflection to the infrared light can be achieved in the Ln layer of the gradient-refractive-index ITO layer. In an example, the gradient-refractive-index ITO layer may be less than 5 μm in thickness, with a transmittance to the visible light larger than 90%. In this way, the total reflection to the infrared light and the transmittance to the visible light can be balanced.

Figure 4:
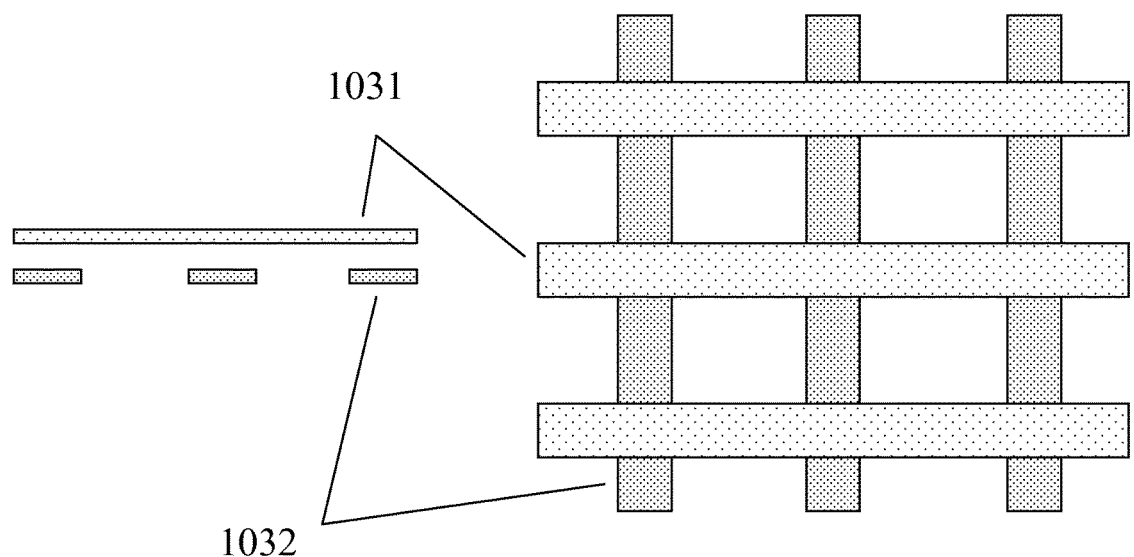
FIG. 4 is a schematic diagram of the structure of the infrared sensing layer of the touch panel according to an embodiment of the present disclosure.

FIG. 4 is a schematic diagram of the structure of the infrared sensing layer 103 of the touch panel according to an embodiment of the present disclosure. As is shown in the figure, the infrared sensing layer 103 may be of a double-layer structure that comprises at least one sensing wire 1031 in a first direction arranged at a first layer and at least one sensing wire 1032 in a second direction arranged at a second layer, wherein the sensing wires 1031 in the first direction and the sensing wires 1032 in the second direction are insulated from each other, and are made of photoconductive material that is sensitive to the infrared light. Upon being irradiated by the light at specific wavelengths, the photoconductive material converts static charges into a current. In other words, this material is a good insulator when not being irradiated by the light at specific wavelengths and becomes a good conductor after being irradiated. The photoconductive material may be categorized into inorganic photoconductive material, such as selenium, selenium-tellurium alloy, cadmium sulfide, zinc oxide and the like, and organic photoconductive material, such as polyvinyl carbazole, some phthalocyanine complexes and some azo compounds. In this embodiment, the sensing wires 1031 in the first direction and the sensing wires 1032 in the second direction are made of photoconductive material that is sensitive to the infrared light emitted from the infrared light emitting device I, e.g. ITO doped with polyvinyl carbazole whose spectral response may be in a range between 800 and 1000 nm. However, other photoconductive material may be used as required.

On the basis of the above description, the determination of the touched region according to an embodiment of the present disclosure will now be explained in detail.

Since the condition for the sensing wires 1031 in the first direction and the sensing wires 1032 in the second direction, which are both made of photoconductive material, to be irradiated by the infrared light in the touched region has been changed, which causes a change in their electrical conductivity, the touched region can be determined by detecting the change in the electric current through and/or the voltage across the sensing wires 1031 in the first direction and the sensing wires 1032 in the second direction. In the case that the electric current is to be detected, a predetermined voltage may be applied across the sensing wires 1031 in the first direction and the sensing wires 1032 in the second direction, respectively (e.g. using two constant voltage sources), and then the change in the electric current through the sensing wires in both directions is detected respectively by the detecting unit. In the case that the voltage is to be detected, a current flows respectively through the sensing wires 1031 in the first direction and the sensing wires 1032 in the second direction (e.g. using two constant current sources) may be applied, and then the change in the voltage across the sensing wires in both directions is detected respectively by the detecting unit. The constant voltage sources and the constant current sources may be provided in the touch panel 100 or may be provided by a circuit outside the touch panel.

Specifically, when no touch is performed, the infrared light emitted from the infrared light-emitting device I is reflected totally by the infrared total reflection coverplate 102 back into the touch panel 100, rendering the infrared sensing layer 103 unable to sense the infrared light. Thus, the sensing wires 1031 in the first direction and the sensing wires 1032 in the second direction, at this time, are poor conductors of electricity with a high resistance value so that the electric current through each of them is relatively small or the voltage across each of them is relatively high.

When a touch is being performed, the infrared total reflection coverplate 102 is made to deform by the touch of the touching object 150. As mentioned above, the infrared light emitted from the infrared light-emitting device I will transmit out of the infrared total reflection coverplate 102 from the deformed region and get into the infrared sensing layer 103. Once irradiated by the infrared light, the sensing wires 1031 in the first direction and the sensing wires 1032 in the second direction in the infrared sensing layer 103 turn into good conductors with a low resistance value, so that the electric current through each of them is relatively large and/or the voltage across each of them is relatively low. The detecting unit identifies the region encompassed by the determined sensing wires as the touched region, by detecting the fluctuation of the electric current through and/or the voltage across the sensing wires 1031 in the first direction and the sensing wires 1032 in the second direction.

That is to say, the detecting unit determines at least one sensing wire through which the electric current is larger and/or across which the voltage is lower from the sensing wires 1031 in the first direction and at least one sensing wire through which the electric current is larger and/or across which the voltage is lower from the sensing wires 1032 in the second direction, and identifys the region encompassed by the determined sensing wires in both directions as the touched region of the touching object.

Figure 5:
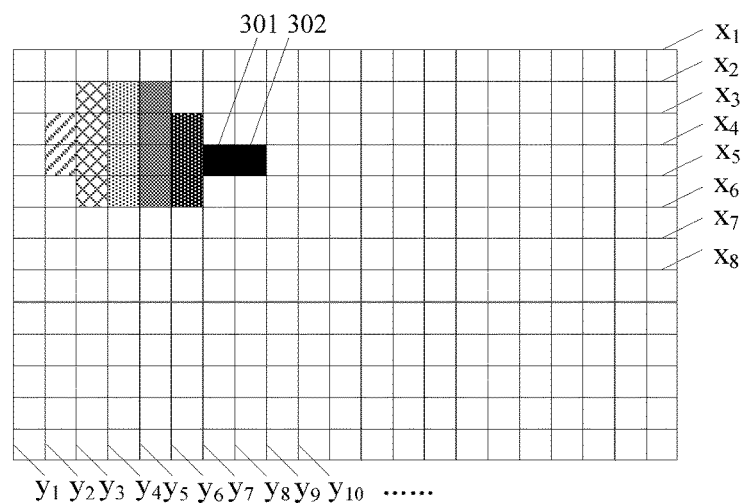
FIG. 5 is a schematic diagram of the determination of a touched region on the touch panel according to an embodiment of the present disclosure.

FIG. 5 is a schematic diagram of the determination of a touched region on the touch panel according to an embodiment of the present disclosure, wherein the sensing wires 1031 in the first direction are the horizontal wires and the sensing wires 1032 in the second direction are the vertical wires. The touch panel touched by the touching object, the currents through horizontal wires x2-x6 fluctuate, wherein the currents through the horizontal wires x4 and x5 are larger; also, the currents through vertical wires y2-y9 fluctuate, wherein the currents through the vertical wires y7, y8 and y9 are larger. Therefore, the regions 301 and 302 encompassed by the horizontal wires x4 and x5 and the vertical wires y7, y8 and y9 are determined as the touched region of the touching object on the touch panel.

In an example, when determining through which sensing wires the electric currents are larger and/or across which sensing wires the voltages are lower, a absolute criterion may be employed, e.g. by judging whether the current is larger than a corresponding predetermined threshold, or by judging whether the voltage is lower than a corresponding predetermined threshold.

In another example, when determining through which sensing wires the electric currents are larger and/or across which sensing wires the voltages are lower, a relative criterion may be employed, e.g. by judging whether the increasing amount of the current is larger than a predetermined threshold—if the increasing amount of the current through a certain sensing wire is larger than the predetermined threshold, the current through this sensing wire is determined as larger, and/or by judging whether the decreasing amount of the voltage is larger than a corresponding predetermined threshold—if the decreasing amount of the voltage across a certain sensing wire is larger than the predetermined threshold, the voltage across this sensing wire is determined as lower.

It should be understood that the overlapped area of the regions of a predetermined size that are adjacent to the determined sensing wires in both directions may be identified as the touched region if the number of the determined sensing wires in the first direction and/or in the second direction is one (i.e. there exists no "encompassed" region by the sensing wires in both directions).

Optionally, the number of, the spacing between and the width of the sensing wires in both directions may be defined by the required touch accuracy. Further, in the above description, the sensing wires in the first direction and the sensing wires in the second direction are shown as perpendicular to each other. However, these sensing wires in two directions may also be arranged to intersect at other angles. Additionally, the sensing wires in the first direction and in the second direction may not be arranged in two separate layers, for example, they may form a structure in which they interleave with each other. In this manner, an "occlusion" that the sensing wires in the layer closer to the infrared light-emitting device I screen the sensing wires in the other layer may be minimized, thus ensuring an approximately equal irradiated area of the sensing wires in either direction by the infrared light.

Figure 6:
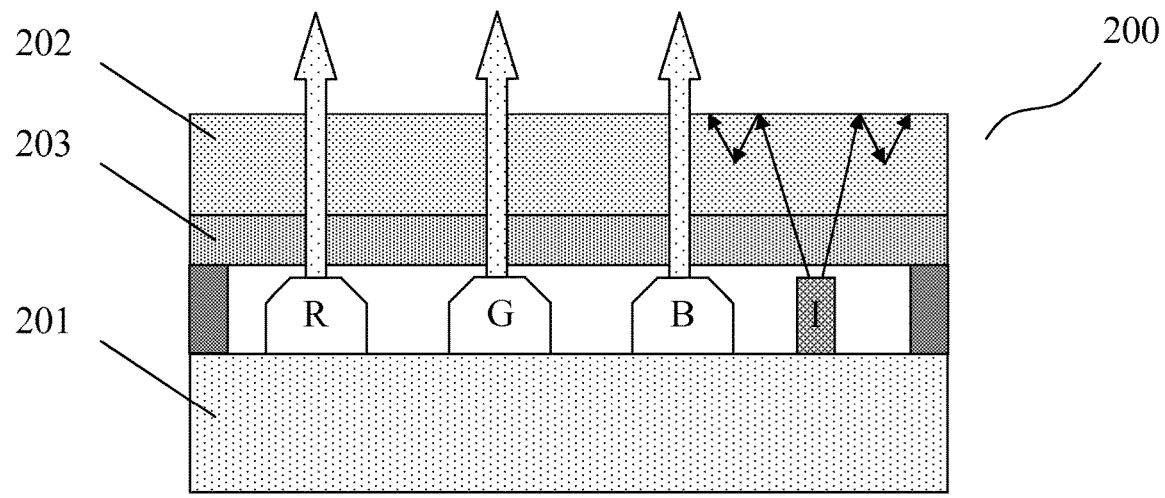
FIG. 6 is a side view of the touch panel according to another embodiment of the present disclosure.

FIG. 6 is a side view of the touch panel 200 according to another embodiment of the present disclosure. The structure of the touch panel 200 differs from that of the touch panel in the above embodiment in that in this touch panel 200, the infrared total reflection coverplate 202 is arranged at the outer side rather than the inner side of the infrared sensing layer 203 along the direction of the emergent light from the OLED device (R, G, B) or the infrared light-emitting device I, and thereby the infrared light-emitting device I is arranged between the substrate 201 and the infrared sensing layer 203. Such a structure results in a modification in the touched region detection accordingly.

When no touch is performed, the infrared light emitted from the infrared light-emitting device I irradiates directly the infrared sensing layer 203, and the infrared total reflection coverplate 202 reflects totally the infrared light transmitting through the infrared sensing layer 203 back into the touch panel 200. At this time, the sensing wires 1031 in the first direction and the sensing wires 1032 in the second direction in the infrared sensing layer 203 turn into good conductors of electricity after being irradiated sufficiently by the infrared light, the electric currents through which are relatively larger.

When a touch is performed, the infrared total reflection coverplate 202 is made to deform by the touch of the touching object, and the infrared light emitted from the infrared light-emitting device I still irradiates directly the infrared sensing layer 203, but a portion of the infrared light will transmit out of the touch panel 200 from the deformed region of the infrared total reflection coverplate 202. Thus, the sensing wires 1031 in the first direction and the sensing wires 1032 in the second direction corresponding to the deformed region sense an irradiation of a lower strength from the infrared light, as compared with the case where no touch is performed, thus resulting in an increase of the resistance value thereof and a decrease of the electric current flowing through. The detecting unit determines from the sensing wires 1031 in the first direction at least one sensing wire through which the electric current is smaller, and determines from the sensing wires 1032 in the second direction at least one sensing wire through which the electric current is smaller. And then the region encompassed by the determined sensing wires in both directions is identified as the touched region of the touching object.

Figure 7:
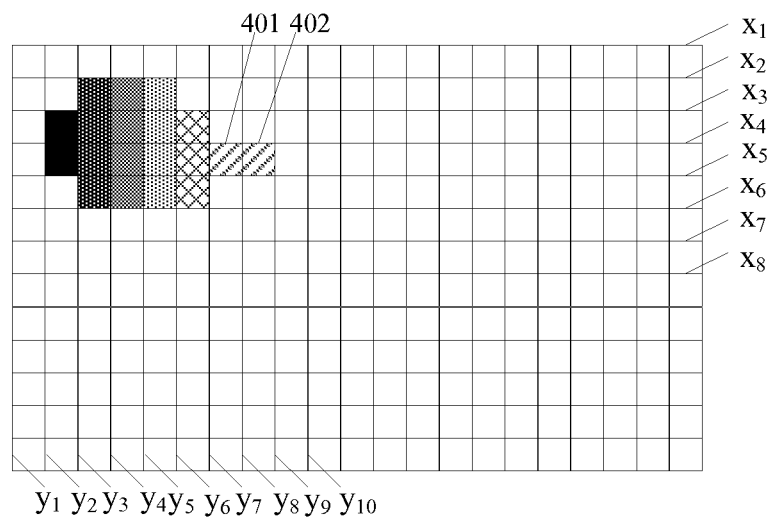
FIG. 7 is a schematic diagram of the determination of a touched region on the touch panel according to another embodiment of the present disclosure.

FIG. 7 is a schematic diagram of the determination of a touched region on the touch panel according to another embodiment of the present disclosure, wherein the sensing wires in the first direction are the horizontal wires and the sensing wires in the second direction are the vertical wires. The touch panel touched by the touching object, the currents through horizontal wires x2-x6 fluctuate, wherein the currents through the horizontal wires x4 and x5 are smaller; also the currents through vertical wires y2-y9 fluctuate, wherein the currents through the vertical wires y7, y8 and y9 are smaller. Therefore, the regions 401 and 402 encompassed by the horizontal wires x4 and x5 and the vertical wires y7, y8 and y9 are determined as the touched region of the touching object on the touch panel.

Similar to the above embodiment, other configurations for the touch panel 100 are applicable to the touch panel 200 in this embodiment. For example, the touch panel 200 may or may not comprise the OLED device, depending on whether a display function is needed.

According to another embodiment of the present disclosure, a touch panel is provided. This touch panel differs from the ones in the above embodiments in that this touch panel is a touchpad which is separate from the display, e.g. the touchpad arranged near the keyboard on a laptop computer.

In this embodiment, since the display function is not required, the OLED and other components that are necessary for providing a display function may not be comprised. Except for that, the touch panel may be of the same structure as that of the touch panel 100 or the touch panel 200 in the above embodiments, which is not discussed any more in detail herein.

In this embodiment, the processor in the touch panel or in the display apparatus may store beforehand the mapping relationship between the touched region on the touch panel and the display region on the display. The touch panel identifying the touched region and/or the track of the touching object, the processor manipulates the display content on the display, e.g. clicking an icon or moving the cursor, etc, according to the touched region and/or the track as well as the mapping relationship.

While the disclosure has been illustrated and described in detail in the drawings and foregoing description, such illustration and description are to be considered illustrative or exemplary and not restrictive; the disclosure is not limited to the disclosed embodiments.

Additionally, variations to the disclosed embodiments can be understood and effected by the skilled person in practicing the claimed disclosure, from a study of the drawings, the disclosure, and the appended claims. In the claims, the word "comprises" or "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A touch panel, comprising:
a substrate;
one or more infrared light-emitting devices;
an infrared total reflection coverplate that is deformable in response to a touch of a touching object; and
an infrared sensing layer comprising at least one sensing wire in a first direction and at least one sensing wire in a second direction, wherein the at least one sensing wire in the first direction and the at least one sensing wire in the second direction are insulated from each other and are made of photoconductive material sensitive to the infrared light emitted from the infrared light-emitting devices; and
wherein the infrared total reflection coverplate comprises a transparent substrate;
a gradient-refractive-index ITO layer arranged on an outer side of the transparent substrate along a direction of emergent light from the infrared light-emitting devices and comprising n layers of ITOs, the n layers of ITOs being stackedly arranged in sequence along the direction of the emergent light and having respective refractive indices to the infrared light that increase progressively along the direction of the emergent light, the refractive indices of the gradient-refractive-index ITO layer to the infrared light being larger than that of the transparent substrate; and
an optically less dense transparent substrate or coat having a refractive index to the infrared light that is less than that of the nth layer of ITO in the gradient-refractive-index ITO layer.

2. The touch panel according to claim 1, wherein the touch panel further comprises an OLED device.

3. The touch panel according to claim 2, wherein the one or more infrared light-emitting devices are arranged between the substrate and the infrared total reflection coverplate, and wherein the infrared sensing layer is arranged on an outer side of the infrared total reflection coverplate along the direction of the emergent light from the infrared light-emitting devices.

4. The touch panel according to claim 2, wherein the one or more infrared light-emitting devices are arranged between the substrate and the infrared sensing layer, and wherein the infrared total reflection coverplate is arranged on an outer side of the infrared sensing layer along the direction of the emergent light from the infrared light-emitting devices.

5. The touch panel according to claim 2, wherein the transparent substrate has a refractive index of 1.5-1.7 to the infrared light, and wherein the gradient-refractive-index ITO layer has a refractive index of 1.7-1.8 to the infrared light.

6. The touch panel according to claim 5, wherein the photoconductive material is ITO doped with polyvinyl carbazole.

7. The touch panel according to claim 6, wherein the infrared light emitted from the infrared light-emitting devices have a wavelength of 800-1000 nm.

8. The touch panel according to claim 5, wherein the at least one sensing wire in the first direction is perpendicular to the at least one sensing wire in the second direction.

9. The touch panel according to claim 1, wherein the one or more infrared light-emitting devices are arranged between the substrate and the infrared total reflection coverplate, and wherein the infrared sensing layer is arranged on an outer side of the infrared total reflection coverplate along the direction of the emergent light from the infrared light-emitting devices.

10. The touch panel according to claim 1, wherein the one or more infrared light-emitting devices are arranged between the substrate and the infrared sensing layer, and wherein the infrared total reflection coverplate is arranged on an outer side of the infrared sensing layer along the direction of the emergent light from the infrared light-emitting devices.

11. The touch panel according to claim 1, wherein the transparent substrate has a refractive index of 1.5-1.7 to the infrared light, and wherein the gradient-refractive-index ITO layer has a refractive index of 1.7-1.8 to the infrared light.

12. The touch panel according to claim 1, wherein the photoconductive material is ITO doped with polyvinyl carbazole.

13. The touch panel according to claim 12, wherein the infrared light emitted from the infrared light-emitting devices have a wavelength of 800-1000 nm.

14. The touch panel according to claim 1, wherein the at least one sensing wire in the first direction is perpendicular to the at least one sensing wire in the second direction.

* * * * *